United States Patent
Henderson et al.

(10) Patent No.: US 9,826,412 B2
(45) Date of Patent: Nov. 21, 2017

(54) FACILITATING ADAPTIVE KEY PERFORMANCE INDICATORS IN SELF-ORGANIZING NETWORKS

(71) Applicants: AT&T Intellectual Property I, LP, Atlanta, GA (US); AT&T Mobility II LLC, Atlanta, GA (US)

(72) Inventors: Thomas W. Henderson, Alpharetta, GA (US); Melanie Sater, Atlanta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 224 days.

(21) Appl. No.: 14/062,605

(22) Filed: Oct. 24, 2013

(65) Prior Publication Data

US 2015/0119020 A1    Apr. 30, 2015

(51) Int. Cl.
*H04W 16/18*    (2009.01)
*H04L 12/26*    (2006.01)
(Continued)

(52) U.S. Cl.
CPC .......... *H04W 16/18* (2013.01); *H04L 43/00* (2013.01); *H04W 24/02* (2013.01);
(Continued)

(58) Field of Classification Search
CPC .... H04W 16/18; H04W 24/00; H04W 28/021
(Continued)

(56) References Cited

U.S. PATENT DOCUMENTS

| | | | |
|---|---|---|---|
| 5,901,361 A * | 5/1999 | Luong | H04W 52/0261 455/127.1 |
| 8,369,286 B2 | 2/2013 | Hamabe et al. | |

(Continued)

FOREIGN PATENT DOCUMENTS

| | | |
|---|---|---|
| AU | 2009202733 B2 | 7/2009 |
| CN | 101815336 | 8/2010 |

(Continued)

OTHER PUBLICATIONS

Sallent, et al., "A roadmap from UMTS optimization to LTE self-optimization," Communications Magazine, IEEE 49.6 (2011) 172-182    /grcm.tsc.upc.edu/sites/default/files/PaperPublicay05784003.pdf>. Retrieved on Sep. 18, 2013, 11 pages.*

(Continued)

*Primary Examiner* — Kamran Afshar
*Assistant Examiner* — Farideh Madani
(74) *Attorney, Agent, or Firm* — Amin, Turocy & Watson, LLP

(57) ABSTRACT

Key performance indicators for self-organizing networks are dynamically updated and/or selected. A method includes evaluating a network condition, ranking key performance indicators (KPIs) based on the network condition resulting in ranking information, and determining weights of executing sets of instructions. The determining is based on the ranking and an association between the executing sets of instructions and the KPIs associated with the ranking information. Another method includes evaluating a network condition, and changing a value of a target of a KPI from a first value to a second value based on a change in the network condition from a first network condition to a second network condition. Another method includes evaluating a network condition, determining weighting factors for (Continued)

respective KPIs, wherein the weighting factors are based on evaluation of the network condition, and generating composite KPI information based, at least, on applying the weighting factors to the respective KPIs.

19 Claims, 12 Drawing Sheets

(51) Int. Cl.
*H04W 24/02* (2009.01)
*H04L 12/24* (2006.01)
*H04W 24/08* (2009.01)
*H04W 28/02* (2009.01)

(52) U.S. Cl.
CPC ......... *H04L 41/5067* (2013.01); *H04W 24/08* (2013.01); *H04W 28/021* (2013.01)

(58) Field of Classification Search
USPC .......................................... 455/423, 424, 425
See application file for complete search history.

(56) References Cited

U.S. PATENT DOCUMENTS

| | | | |
|---|---|---|---|
| 8,467,351 B2 | 6/2013 | Liu et al. | |
| 2007/0087756 A1* | 4/2007 | Hoffberg | G06Q 10/0631 455/450 |
| 2008/0001975 A1* | 1/2008 | Obara | G06T 5/20 345/694 |
| 2008/0316966 A1* | 12/2008 | Joshi | H04W 74/02 370/330 |
| 2009/0257353 A1 | 10/2009 | Song et al. | |
| 2010/0232318 A1 | 9/2010 | Sarkar | |
| 2010/0254344 A1 | 10/2010 | Wei et al. | |
| 2010/0287554 A1* | 11/2010 | Amundsen | G06F 9/466 718/101 |
| 2010/0299419 A1 | 11/2010 | Ramankutty et al. | |
| 2011/0026492 A1 | 2/2011 | Frenger et al. | |
| 2011/0092195 A1* | 4/2011 | Hussein | H04W 24/02 455/418 |
| 2011/0244858 A1 | 10/2011 | Callender | |
| 2012/0039175 A1 | 2/2012 | Sridhar et al. | |
| 2012/0039213 A1 | 2/2012 | Cheng et al. | |
| 2012/0250498 A1 | 10/2012 | Johansson et al. | |
| 2013/0028126 A1 | 1/2013 | Kazmi | |
| 2013/0040558 A1 | 2/2013 | Kazmi | |
| 2013/0089033 A1 | 4/2013 | Kahn et al. | |
| 2013/0124607 A1* | 5/2013 | Griffith | H04L 43/10 709/203 |
| 2013/0163424 A1 | 6/2013 | Goerke et al. | |
| 2014/0129298 A1* | 5/2014 | Hulen | G06Q 10/06393 705/7.39 |

FOREIGN PATENT DOCUMENTS

| | | | |
|---|---|---|---|
| CN | 102088666 A | 6/2011 | |
| EP | 2120493 A1 | 11/2009 | |
| JP | 02161501 A | 6/1990 | |
| JP | 04114264 A | 4/1992 | |
| WO | 2012114153 A1 | 8/2012 | |
| WO | 2013024408 A1 | 2/2013 | |
| WO | 2013036793 A1 | 3/2013 | |
| WO | 2013118056 A2 | 8/2013 | |
| WO | 2013124435 A1 | 8/2013 | |
| WO | WO 2013124435 A1 * | 8/2013 | ........... H04L 41/044 |

OTHER PUBLICATIONS

Sallent, et al., "A roadmap from UMTS optimization to LTE self-optimization," Communications Magazine, IEEE 49.6 (2011) : 172-182 <http://grcm.tsc.upc.edu/sites/default/files/PaperPublicat_05784003.pdf>. Retrieved on Sep. 18, 2013, 11 pages.

Hu, et a., "Self-configuration and self-optimization for LTE networks," Communications Magazine, IEEE 48.2 (2010): 94-100. <http://www.singal.uu.se/Publications/pdf/p1002.pdf>. Retrieved on Sep. 18, 2013, 7 pages.

* cited by examiner

| | TARGET KEY PERFORMANCE INDICATORS | | |
|---|---|---|---|
| | CONGESTION | DROPPED CALL RATE | COVERAGE |
| RANKING INFORMATION FOR NETWORK CONDITION 1 | 1 | 3 | 2 |
| RANKING INFORMATION FOR NETWORK CONDITION 2 | 3 | 2 | 1 |
| RANKING INFORMATION FOR NETWORK CONDITION 3 | 2 | 1 | 3 |

FIG. 4

| | EXECUTING SETS OF INSTRUCTIONS | | |
|---|---|---|---|
| | A | B | C |
| WEIGHT INFORMATION FOR NETWORK CONDITION 1 | 0.7 | 0.1 | 0.2 |
| WEIGHT INFORMATION FOR NETWORK CONDITION 2 | 0.85 | 0.1 | 0.05 |
| WEIGHT INFORMATION FOR NETWORK CONDITION 3 | 0.15 | 0.75 | 0.1 |

FIG. 5

| | COMPOSITE TARGET KEY PERFORMANCE INDICATOR INFORMATION | | |
|---|---|---|---|
| | CONGESTION | DROPPED CALL RATE | COVERAGE |
| NETWORK CONDITION 1 | 0.3 | 0.35 | 0.35 |
| NETWORK CONDITION 2 | 0.75 | 0.15 | 0.1 |
| NETWORK CONDITION 3 | 0.17 | 0.8 | 0.03 |

FIG. 6

FACILITATING ADAPTIVE KEY PERFORMANCE INDICATORS IN SELF-ORGANIZING NETWORKS

TECHNICAL FIELD

The subject disclosure relates generally to self-organizing networks (SONs), and specifically to facilitating adaptive key performance indicators (KPIs) for SONs.

BACKGROUND

Wireless communications networks are growing at an increasing rate and the numbers of users and types of devices, technologies and services are expanding exponentially. A corresponding increase in complexity of management of these networks abounds. SONs can facilitate automation of management of the complex scenarios that arise in the aforementioned environments.

BRIEF DESCRIPTION OF THE DRAWINGS

FIG. 4 illustrates an example block diagram of a table detailing sample ranking information for KPIs generated by a ranking component of adaptation device of FIG. 2 in accordance with one or more embodiments described herein.

FIG. 5 illustrates an example block diagram of a table detailing weighting information for executing algorithms or sets of instructions or sets of processes generated by a weighting component of adaptation device of FIG. 2 in accordance with one or more embodiments described herein.

FIG. 6 illustrates an example block diagram of a table detailing weighting information for KPIs from which composite KPIs are generated by a composite KPI component of adaptation device of FIG. 2 in accordance with one or more embodiments described herein.

DETAILED DESCRIPTION

Figure 1:
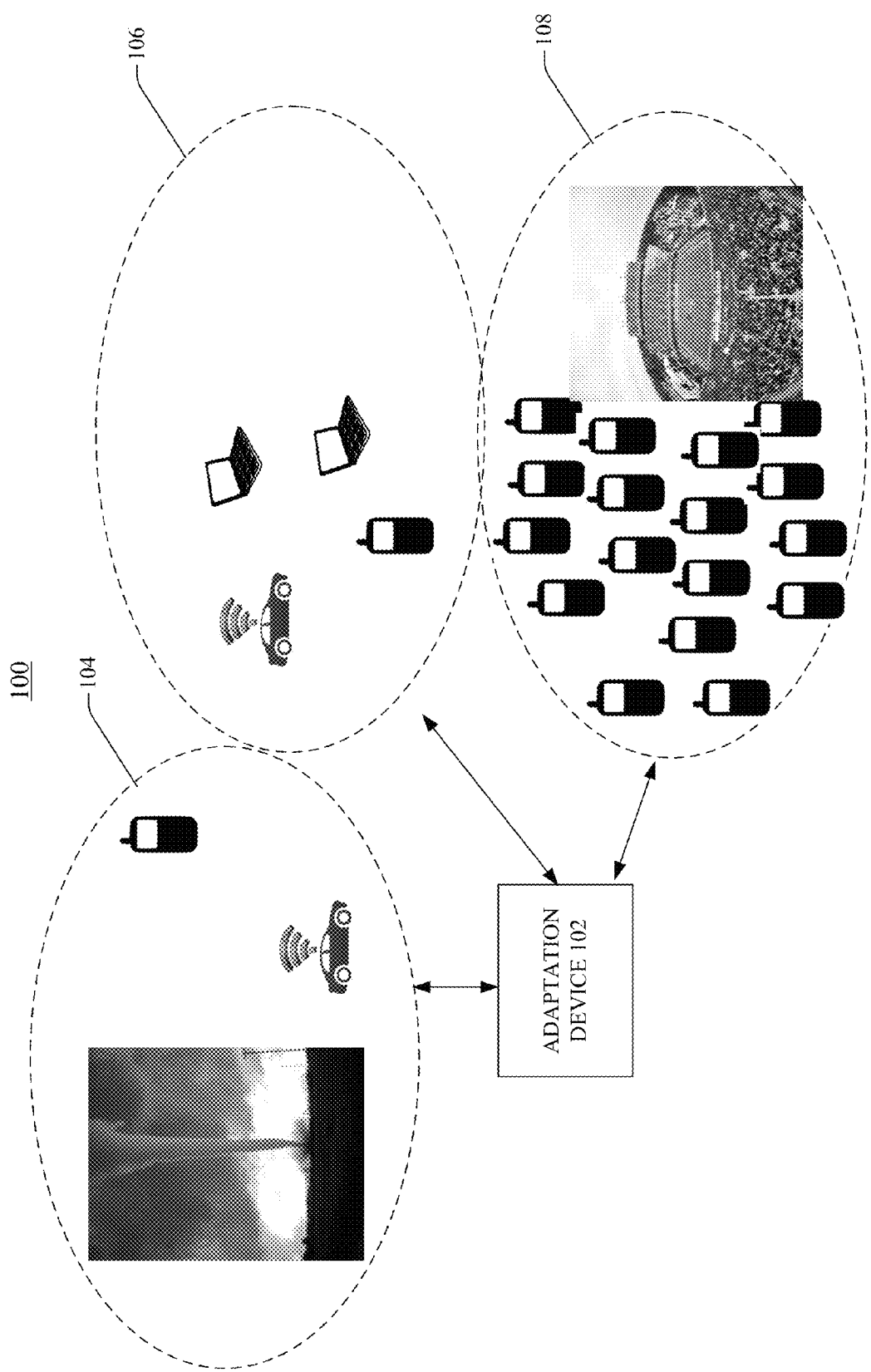
FIG. 1 illustrates an example block diagram of a system in which adaptive KPIs for SONs can be facilitated in one or more embodiments.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (femto cell device)," "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the term "femto" and "femto cell" are used interchangeably, and the terms "macro" and "macro cell" are used interchangeably.

Wireless communications networks are growing at an increasing rate and the numbers of users and types of devices, technologies and services are expanding exponentially. A corresponding increase in complexity of management of these networks abounds. SONs can facilitate automation of management of the complex scenarios that arise from these environments.

Further, solving networking issues in a SON network is facilitated when various SON components converge. The likelihood of convergence is increased when optimized or near-optimized value is achieved, which typically occurs when a target value of a KPI has been reached. Network performance KPI targets related to the completion of a function instance cycle of a single SON executing set of instructions or multiple SON executing set of instructions or sets of instructions are typically static. In a network that experiences the same or similar network conditions (e.g., capacity, coverage, etc.) throughout the day, a static KPI target value may be tolerable. However a KPI target value that is optimal or tolerable under normal traffic conditions (e.g., non-event traffic, non-busy hour traffic) within the network may be undesirable during heavy traffic conditions that cause a congested network. Further, in a complex network with multiple layers (e.g., macro cells, pico cells, femto cells) and multiple technologies (e.g., LTE, UMTS, Wi-Fi, etc.) and various traffic conditions, a more dynamic adaptive KPI for SON function instance cycle completion may be desired.

Multiple SON sets of instructions executing concurrently or in a serial manner can converge on a single static KPI target value or independently converge on a single static performance target. Thresholds for modifying SON function instance cycle performance targets for either individual SON sets of instructions, or multiple SON sets of instructions running simultaneously, could be user-defined in an open loop system or pre-set in a closed loop system. Closed loop sets of instructions may provide improved network performance, particularly when the architecture incorporates shorter response times (e.g., shorter performance intervals, more real-time processing).

In the embodiments described herein, ranking or selection of KPIs, selection of values for the KPIs or composite KPI information can be generated in real-time or near real-time to compensate for slow and fast variations in the network condition thereby improving the likelihood of optimal performance.

Systems, methods, apparatus and/or computer-readable storage media described herein facilitate adaptive KPIs for SONs. In one embodiment, a method includes evaluating, by a device comprising a processor, a network condition of network conditions, wherein the network condition is associated with a SON. The method also includes: evaluating, by a device comprising a processor, a network condition of network conditions, wherein the network condition is associated with network devices of a SON; ranking, by the device, KPIs based on the network condition resulting in ranking information; and determining, by the device, weights of executing sets of instructions, wherein the determining is based on the ranking and an association between the executing sets of instructions and the KPIs associated with the ranking information.

In another embodiment, an apparatus includes: a memory to store executable instructions; and a processor, coupled to the memory, that facilitates execution of the executable instructions to perform operations. The operations include: evaluating a network condition of network conditions, wherein the network condition is associated with a set of network devices of a SON; and changing a value of a target of a KPI from a first value to a second value based on a change in the network condition from a first network condition to a second network condition.

In another embodiment, a computer-readable storage medium is provided. The computer-readable storage medium stores computer-executable instructions that, in response to execution, cause a device comprising a processor to perform operations. The operations include: evaluating a network condition of network conditions, wherein the network condition is associated with a set of network devices of a SON; determining weights for respective KPIs, wherein the weights are based on the evaluating of the network condition; and generating composite KPI information based on applying the weights to the respective KPIs.

One or more embodiments can advantageously allow for granular KPI target adaptation for SON executing sets of instructions, which can improve and speed the time to adjust the overall network metrics. The embodiments herein can adjust SON executing sets of instructions to result in a network performance improvement over coverage, capacity, throughput and/or voice quality.

Turning now to the drawings, FIG. 1 illustrates an example block diagram of a system in which adaptive KPIs for SONs can be facilitated in one or more embodiments. In various embodiments, KPIs can include, but are not limited to, congestion, dropped call rate, coverage for a network. System 100 can include adaptation device 102 and one or more networks 104, 106, 108 having wireless communication traffic. Adaptation device 102 and one or more of networks 104, 106, 108 or components (not shown) of networks 104, 106, 108 can be electrically and/or communicatively coupled to one another to perform one or more functions of adaptation device 102 and/or system 100. In various embodiments, networks 104, 106, 108 can be any number of different layers (e.g., macro cells, pico cells, femto cells) or technologies (e.g., LTE, UMTS, Wi-Fi). System 100 and/or one or more of networks 104, 106, 108 can be or include a SON, in various embodiments.

Different network conditions, including, but not limited to, presence of congestion, presence of dropped calls, presence of coverage (or lack of coverage) and/or event traffic (e.g., weather-related event traffic, sports-related event traffic) can be detected by adaptation device 102 in one or more of networks 104, 106, 108. In various embodiments, adaptation device 102 of system 100 can facilitate automatic and/or dynamic adjustment or selection of one or more KPIs, one or more KPI target values and/or composite KPI information based on one or more conditions within networks 104, 106, 108.

As shown in FIG. 1, network 104 includes a geographical region having a weather-related event that can be detected by adaptation device 102. Network 106 includes an uneventful traffic pattern (e.g., low amount of traffic, little to no congestion, dropped calls or coverage issues). Network 108 includes a geographical region experiencing congestion. The congested network condition of network 108 is shown in connection with a sporting event; however, in other embodiments, high density geographical areas (e.g., New York City) can have congested network conditions based solely on population density of wireless device users.

In various embodiments, adaptation device 102 can include hardware, software or a combination of hardware and software to receive information about traffic patterns in networks 104, 106, 108, generate information about network conditions based on the traffic patterns and determine or update KPIs, KPI values or composite KPI information based on the network conditions. In various embodiments, the determination and/or updates can be performed in real-time or near real-time relative to the time that the traffic pattern or network condition changes or is detected by adaptation device 102. In some embodiments, the term "real-time" can mean on the order of milliseconds or microseconds after the traffic pattern or network condition changes or is detected by the adaptation device 102 (during a call flow). In some embodiments, the term "near real-time" can imply added processing time after the traffic pattern or network condition changes or is detected by the adaptation device 102.

Figure 2:
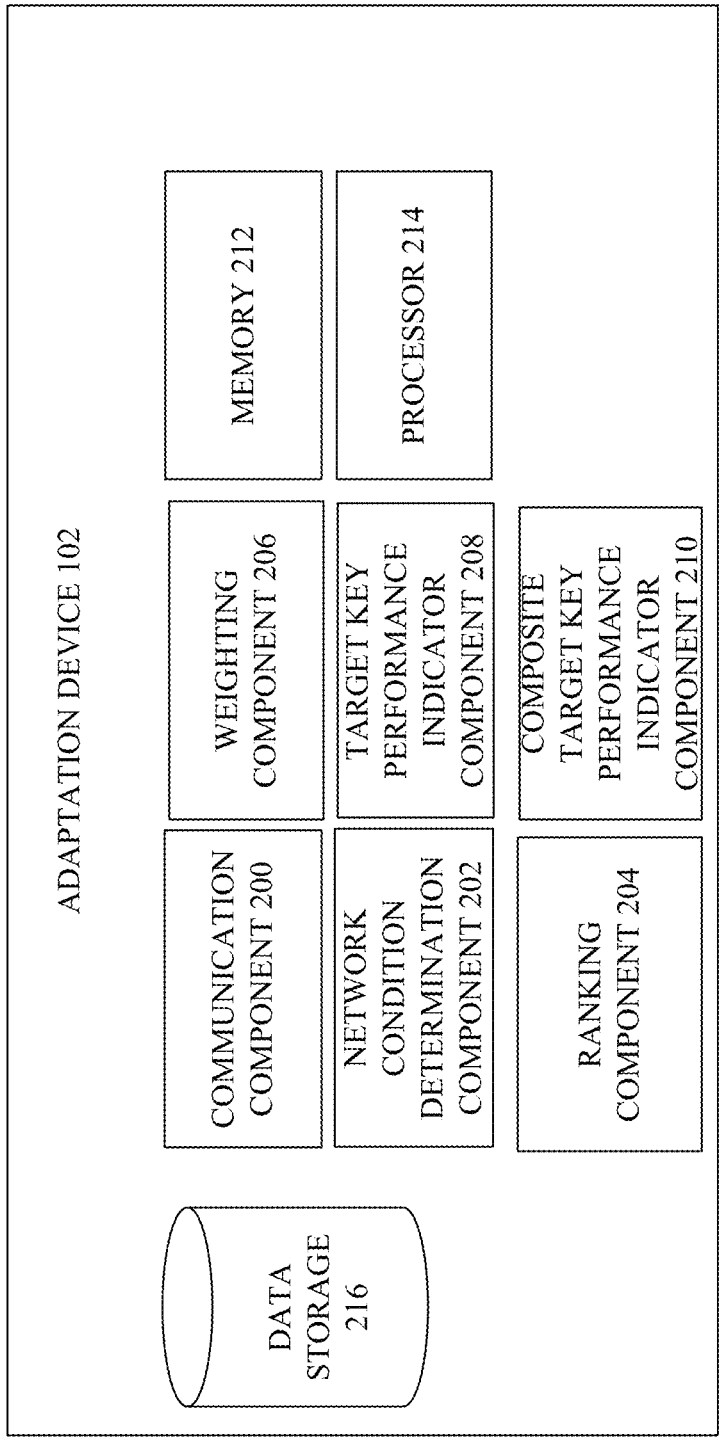
FIG. 2 illustrates an example block diagram of an adaptation device that can facilitate adaptive KPIs for SONs in accordance with one or more embodiments described herein.
Figure 3:
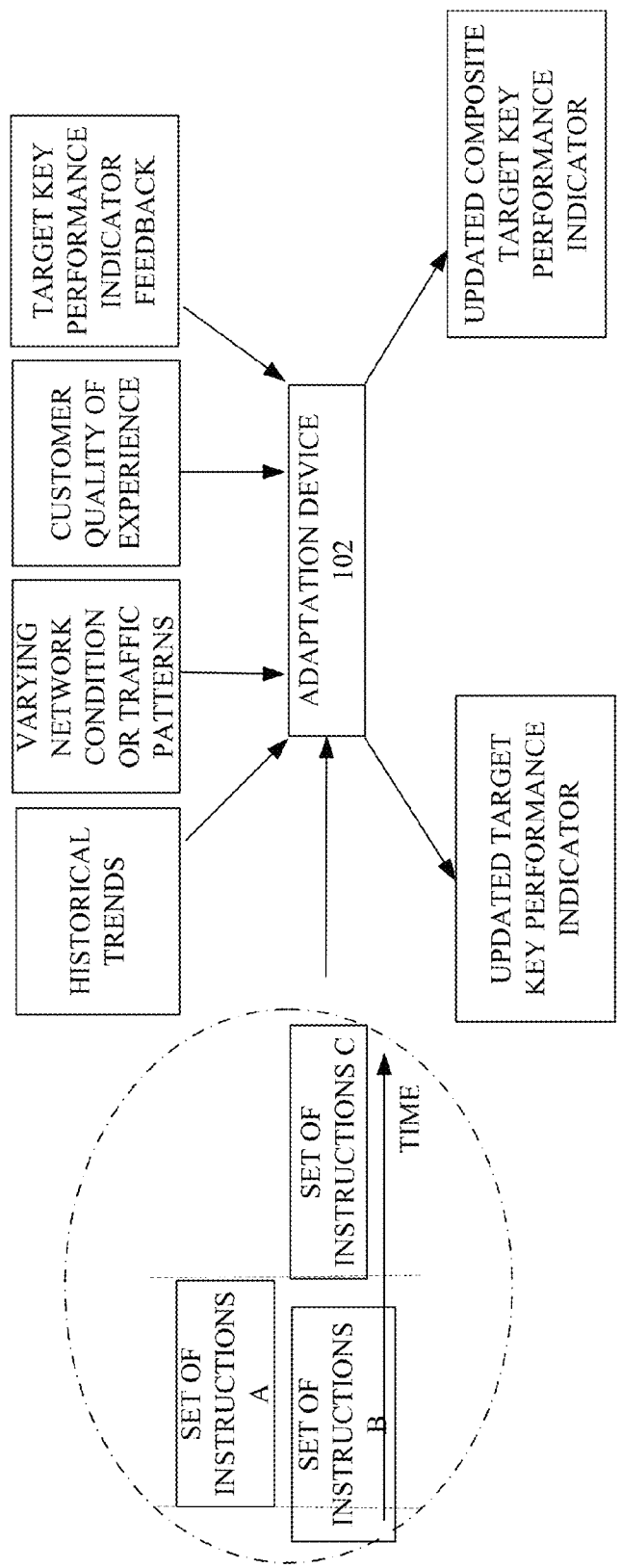
FIG. 3 illustrates an example flow diagram of a system including the adaptation device of FIG. 2 to facilitate adaptive KPIs for SONs in accordance with one or more embodiments described herein.

The structure and/or functionality of adaptation device 102 will be described in greater detail with reference to FIGS. 2-7. Turning first to FIGS. 2 and 3, FIG. 2 illustrates an example block diagram of an adaptation device that can facilitate adaptive KPIs for SONs in accordance with one or more embodiments described herein. FIG. 3 illustrates an example flow diagram of a system including the adaptation device of FIG. 2 to facilitate adaptive KPIs for SONs in accordance with one or more embodiments described herein. Repetitive description of like elements employed in respective embodiments of systems and/or apparatus described herein are omitted for sake of brevity.

Adaptation device 102 can include communication component 200, network condition determination component 202, ranking component 204, weighting component 206, target KPI component 208, composite target KPI component 210, memory 212, processor 214 and/or data storage 216. In various embodiments, one or more of communication component 200, network condition determination component 202, ranking component 204, weighting component 206, target KPI component 208, composite target KPI component 210, memory 212, processor 214 and/or data storage 216 can be electrically and/or communicatively coupled to one another to perform one or more functions of adaptation device 102.

Communication component 200 can transmit information from and/or receive information at adaptation device 102. For example, in various embodiments, communication component 200 can receive information about traffic patterns and/or network conditions in a SON. Information about traffic patterns or network conditions can include, but is not limited to, information about a number of network users in a geographic region of a network, a level of congestion in a network, a dropped call rate of a network, a measure of coverage of a network, presence of an event in the network, a number of calls initiated between a source and destination repeatedly within a defined time (e.g., one minute) and indicative of dropped and re-attempted calls or the like. Communication component 200 can transmit information indicative of a selected or updated target KPI for the network; a selected or updated target KPI value for the network; and/or an adjusted or generated composite KPI target for the network.

Network condition determination component 202 can determine the condition of a network for which traffic pattern or other information was received by communication component 200. Network condition determination component 202 can determine the network condition in a number of different ways. By way of example, but not limitation, network condition determination component 202 can compare a level of congestion, dropped call rate or coverage amount in a network to defined respective values (e.g., thresholds), for example. Network condition determination component 202 can determine that the network condition is indicative of a congested network condition if the level of congestion for the network is greater than or substantially equal to the respective threshold value for congestion in the network. Similarly, network condition determination component 202 can determine that the network condition is indicative of a network having a considerable dropped call rate if the dropped call rate for the network is greater than or substantially equal to the respective threshold value for dropped call rate in the network. Similarly, network condition determination component 202 can determine that the network condition is indicative of a network having a considerable coverage deficiency if the amount of coverage for the network is greater than or substantially equal to the respective threshold value for the amount of coverage in the network.

In some embodiments, in lieu of comparing the traffic information to a defined value, network condition determination component 202 can evaluate a pattern of the traffic in a network and determine the network condition based on the pattern. For example, if network condition determination component 202 determines that second or third calls are originating between the same source and destination within a defined amount of time after a first call originated between the source and destination, network condition determination component 202 can determine that the dropped call rate is a network condition.

As another example, if network condition determination component 202 determines that the traffic pattern shows that the network traffic is increasing equal to or greater than a defined rate, network condition determination component 202 can determine that congestion is a network condition.

As another example, if network condition determination component 202 determines that a weather-related event (e.g., storm, tornado, hurricane, earthquake, tsunami) is ongoing in a network, network condition determination component 202 can determine that lack of coverage is a network condition.

Ranking component 204 can rank different KPIs from a set of possible KPIs based on the network condition determined by network condition determination component 202. For example, ranking component 204 can evaluate one or more KPIs for the network and rank the KPIs in order of relevance to the network condition. Ranking component 204 can determine that a KPI has relevance to a network condition based on whether the KPI is directed towards addressing the network condition. By way of example, but not limitation, for a network with a dense population of wireless users in a major city, or for a dense population of users at a sporting event, the network condition can be congestion. Accordingly, congestion KPI or KPI associated with congestion (e.g., percentage of a network cell site that is congested) can be ranked higher by ranking component 204 than a dropped call rate KPI if network condition is determined to be a congested condition.

In some embodiments, for a network having a typical traffic condition in which traffic is not varying more than a defined amount per a defined time (e.g., hourly, daily) network condition determination component 202 can output information to ranking component 204 indicative of a typical, average network and ranking component 204 can rank the dropped call rate KPI higher than the congestion or coverage KPIs.

In some embodiments, for a network having a significant geographical area experiencing a severe weather-related event (e.g., tsunami, earthquake), ranking component 204 can rank a coverage KPI higher than the congestion or dropped call rate KPIs due to likely network outages at areas affected by the weather-related event.

FIG. 4 illustrates an example block diagram of a table detailing sample ranking information for KPIs generated by a ranking component of adaptation device of FIG. 2 in accordance with one or more embodiments described herein. In particular, ranking information is shown for congestion, dropped call rate and coverage KPIs. As shown, for a first network condition, ranking information indicates a ranking order of congestion, coverage and dropped call rate KPIs. As such, for this network condition, the congestion KPI is determined to be the most important KPI to employ in addressing the network condition while dropped call rate is determined to be the least important KPI to employ in addressing the network condition. For a second network condition, ranking information indicates a ranking order of coverage, dropped call rate and congestion. For a third network condition, ranking information indicates a ranking order of dropped call rate, congestion and coverage.

Weighting component 206 will be discussed with reference to FIGS. 2, 4 and 5. FIG. 5 illustrates an example block diagram of a table detailing weighting information for executing sets of instructions generated by a weighting component of adaptation device of FIG. 2 in accordance with one or more embodiments described herein.

Weighting component 206 can apply a weight to one or more sets of instructions associated with the SON. The one or more sets of instructions can be those executing concurrently or executing in series relative to the execution of one or more of the other sets of instructions. Two sets of instructions executing in series can be executed such that one set of instructions begins execution after the completion of the execution of another set of instructions.

In some embodiments, weighting component 206 can generate and/or apply weights to sets of instructions based on the ranked order of KPIs generated by ranking component 204. For example, with reference to FIGS. 4 and 5, if set of instructions A addresses congestion, set of instructions B addresses dropped call rate and set of instructions C addresses coverage, for the first network condition of FIG. 4 in which the ranking order of KPIs is congestion, coverage and dropped call rate, weighting component 206 can apply a highest value weight to set of instructions A (since set of instructions A addresses congestion), a lowest value weight to set of instructions B (since set of instructions B addresses dropped call rate) and a middle value weight to set of instructions C (since set of instructions C addresses dropped call rate).

In some embodiments, weighting component 206 can generate and/or apply weights to two or more sets of instructions that address the same KPI. For example, if two sets of instructions addressed dropped call rate with different dropped call rate target values, weighting component 206 can apply weights to the two sets of instructions based on the network condition. If the network condition results in a ranking order showing congestion to be the highest-ranking condition of concern for the network, and both sets of instructions address congestion, weighting component 206 can apply weights to the two sets of instructions in numerous different ways. Weighting component 206 could apply a substantially equal weight to each set of instructions in one embodiment. In another embodiment, weighting component 206 can apply a higher weight to the set of instructions that has the most appropriate dropped call rate KPI value according to the severity of the network condition that the sets of instructions address. For example, if both sets of instructions address dropped call rate, if the network condition indicates a dropped call network condition that is greater than a defined value, and is determined to be severe, weighting component 206 can apply a higher weight to an set of instructions that has a more aggressive dropped call rate while applying a lower weight to an set of instructions that has a less aggressive dropped call rate, notwithstanding each set of instructions address dropped call rate.

In some embodiments, the one or more sets of instructions can be based on or targeted for addressing one or more respective KPIs. For example, a first set of instructions (e.g., set of instructions A) can be designed to address congestion while set of instructions B can be designed to address coverage. In some embodiments, both set of instructions A and set of instructions B can be designed to address the same KPI but have different values for the targets of the KPI because the sets of instructions can be designed to operate in different network conditions. For example, sets of instructions A and B can be designed to address dropped call rate but set of instructions A can have a target KPI value of 0.5 percent while set of instructions B can have a target KPI value of 0.75 percent. Weights can be applied to the sets of instructions to result in a modified target KPI value that is a value between 0.5 percent and 0.75 percent, for example.

Target KPI component 208 can select or adjust the KPIs for a network based on the ranking information generated by ranking component 204 and/or network condition. For example, based on ranking component 204 output, target KPI component 208 can select the KPI ranked highest by ranking component 204 as the current KPI by which the network performance should be monitored and/or steered. As another example, target KPI component 208 can adjust the KPI target value based on the needs of the network as indicated in the ranking information and/or network condition. Accordingly, embodiments described herein can dynamically adjust the identities of one or more KPIs of interest/focus for a network based on network condition. Embodiments described herein can also dynamically adjust the target of an existing or new KPI of interest/focus based on network condition.

For example, if the network condition indicates a congested environment, target KPI component 208 can shift the KPI from a first KPI (e.g., coverage KPI or dropped call rate KPI) to a congestion KPI. Target KPI component 208 can also identify related KPIs. For example, target KPI component 208 can identify a KPI that measures the rate at which a cell is filling and/or the congestion in a cell (e.g., 90% congested versus 100% congested). Accordingly, target KPI component 208 can not only dynamically modify the KPI for a network but also change the KPI from a first KPI to a second KPI depending on the network condition.

In some embodiments, target KPI component 208 can adjust or update values for KPIs based on network condition. For example, in one embodiment, a KPI target can have a first value if a first set of instructions is the sole set of instructions executing while changing the KPI target to a second value if a first set of instructions and second set of instructions are concurrently executing.

Composite target KPI component 210 will be described with reference to FIGS. 2 and 6. FIG. 6 illustrates an example block diagram of a table detailing weighting information for KPIs from which composite KPIs are generated by a composite KPI component of adaptation device of FIG. 2 in accordance with one or more embodiments described herein. Composite target KPI component 210 can generate composite KPI information.

In various embodiments, composite target KPI component can apply weights selected by weighting component 206 to respective KPIs and generate a composite KPI and/or composite KPI value based on the weights applied to the KPIs. As shown in FIG. 6, different network conditions can result in different weights being applied to different KPIs to create different composite KPIs to address the network condition. For example, network condition 3 is one in which the dropped calls is a significant aspect of the network condition and is weighted 0.8 while congestion and coverage are minor aspects of the network condition and are weighted 0.17 and 0.03, respectively. In another embodiment, network condition 1 is one in which congestion, dropped call rate and coverage are substantially of equal concern in the network and are weighted 0.3, 0.35 and 0.35, respectively.

In some embodiments, composite target KPI component 210 can select a subset of possible KPIs to include in the composite target KPI component 210 based on any number of different factors including, but not limited to, customer quality of experience, historical trends/information, feedback on network performance with similar conditions for one or more different composite KPIs or the like.

Turning back to FIG. 2, memory 212 can be a computer-readable storage medium storing computer-executable instructions and/or information for performing the functions described herein with reference to adaptation device 102. For example, memory 212 can store computer-executable instructions that can be executed by processor 214 to perform communication, evaluation, adaptation, decision-making or other types of functions executed by adaptation device 102. Processor 214 can perform one or more of the functions described herein with reference to adaptation device 102.

Figure 7:
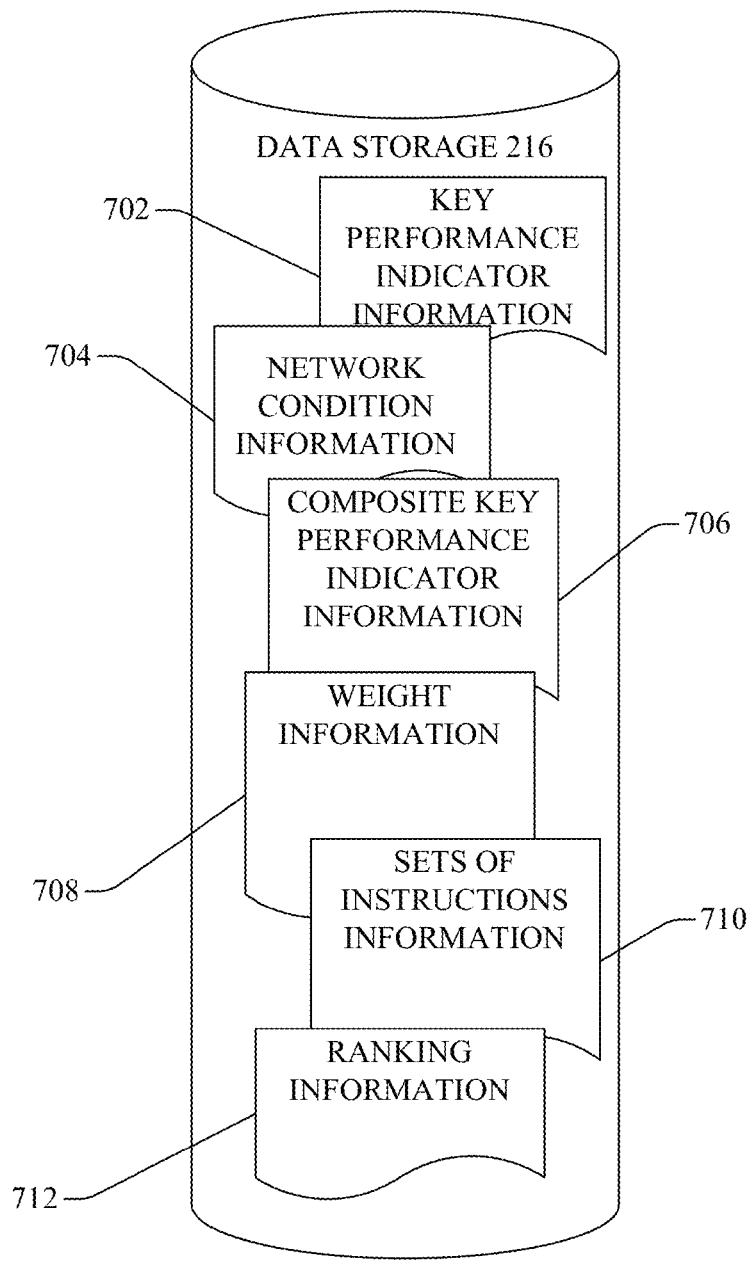
FIG. 7 illustrates an example block diagram of data storage of the device of FIG. 2 in accordance with one or more embodiments described herein.

Data storage 216 can be described in greater detail with reference to FIG. 7. FIG. 7 illustrates an example block diagram of data storage of the device of FIG. 2 in accordance with one or more embodiments described herein. As shown, data storage 216 can be configured to store information accessed by, received by and/or processed by adaptation device 102 (or any components of adaptation device 102).

In some embodiments, data storage 216 can include KPI information 702 for one or more networks. In various embodiments, the KPI information 702 can include, but is not limited to, information about congestion (e.g., level of congestion, how quickly a cell is filling) in one or more networks, information about dropped calls (e.g., level of dropped calls, presence or lack of presence of dropped calls) in one or more networks, information about coverage (e.g., amount of coverage or lack of coverage, areas having coverage deficiencies) in one or more networks and/or information about events (e.g., presence or lack of presence of events in the network likely to impact network performance).

In some embodiments, KPI information 702 can include information indicative of one or more target values for one or more KPIs in one or more networks. In various embodiments, KPI information 702 can include past or current KPI information or KPI target values. In some embodiments, KPI information 702 can include information indicative of feedback regarding network performance with various different orders in which KPIs were previously ranked for various network conditions.

Data storage 216 can also include network condition information 704. In various embodiments, network condition information 704 can be or include information indicative of a determined condition of the network and/or information indicative of past or present traffic conditions for a network.

Data storage 216 can also include composite KPI information 706. For example, each KPI from which a composite KPI is composed can be given a weight. The weighting factor can be based on the network condition and the corresponding relevance to addressing the network condition. The composite KPI information 706 can include information such as the selected KPIs from which the composite is composed and/or the weighting factors for each of the selected KPIs that compose a particular composite KPI.

Data storage 216 can also include weight information 708. Weight information 708 can include information indicative of weights assigned to respective sets of instructions associated with the network. In various embodiments, the weights can be based on network condition, ranking of KPIs or the like. For example, a first set of instructions can be associated with a first KPI and a second set of instructions can be associated with a second KPI. If the first KPI is ranked higher than the second KPI, the first set of instructions can have a larger weight than the weight associated with the second set of instructions.

Data storage 216 can also include sets of instructions information 710. Sets of instructions information 710 can include, but is not limited to, information about whether a set of instructions is currently executing, whether two or more sets of instructions are concurrently executing or scheduled to execute in series, the KPI target value associated with the set of instructions, identifying characteristics of the set of instructions, computer code associated with the sets of instructions or the like.

Data storage 216 can also include ranking information 712. Ranking information 712 can include information about current or past ranking of target KPIs for one or more networks. For example, for a typical traffic condition in which traffic is not varying more than a defined amount per a defined time (e.g., hourly, daily) and congestion is below a defined value, dropped calls target KPI can be ranked higher than congestion target KPI. By contrast, for a network in a geographical area that is extremely dense with likelihood of communication traffic higher than a defined value, congestion target KPI can be ranked higher than dropped calls target KPI.

FIG. 3 illustrates an example flow diagram of a system including the adaptation device of FIG. 2 to facilitate adaptive KPIs for SONs in accordance with one or more embodiments described herein. In FIG. 3, sets of instructions (e.g., sets of instructions A, B and C) are provided as part of the SON that can execute concurrently or in series and can finish execution when the KPI target is met. One or more KPI target values can be dynamically adjusted based on varying network conditions and weighting of sets of instructions (which is also based on varying network conditions). Customer quality of experience, historical trend information, varying network condition information and/or KPI target feedback can also be input to adaptation device 102. Adaptation device 102 can perform analysis and computation to determine KPI information, KPI target information and/or composite KPI information. The determination can be made in real-time or near real-time. In some embodiments, the composite KPI information can be determined for multiple sets of instructions affecting the same impact region. The KPI target can be dynamic and change the set of instructions weighting and KPI target thresholds based on network condition.

In the embodiment shown in FIG. 3, numerous sets of instructions can be executing concurrently and/or serially. For example, FIG. 3 illustrates sets of instructions A and B executing concurrently and set of instructions C executing serially after sets of instructions A and B. The sets of instructions can finish execution when the selected target KPI is met. While the sets of instructions are as shown in FIG. 3, in various embodiments, any combination or permutation of sets of instructions can execute concurrently or serially. For example, a set of sets of instructions can include the same set of instructions being executed more than once. In this regard, in lieu of sets of instructions A, B, C, in some embodiments, for example, sets of instructions A, B, B or A, B, A can execute concurrently and/or serially. Adaptation device 102 can dynamically adjust the KPI or KPI target value to one or more different values based on varying network conditions. In various embodiments, different target KPIs can be ranked based on network conditions.

Figure 8:
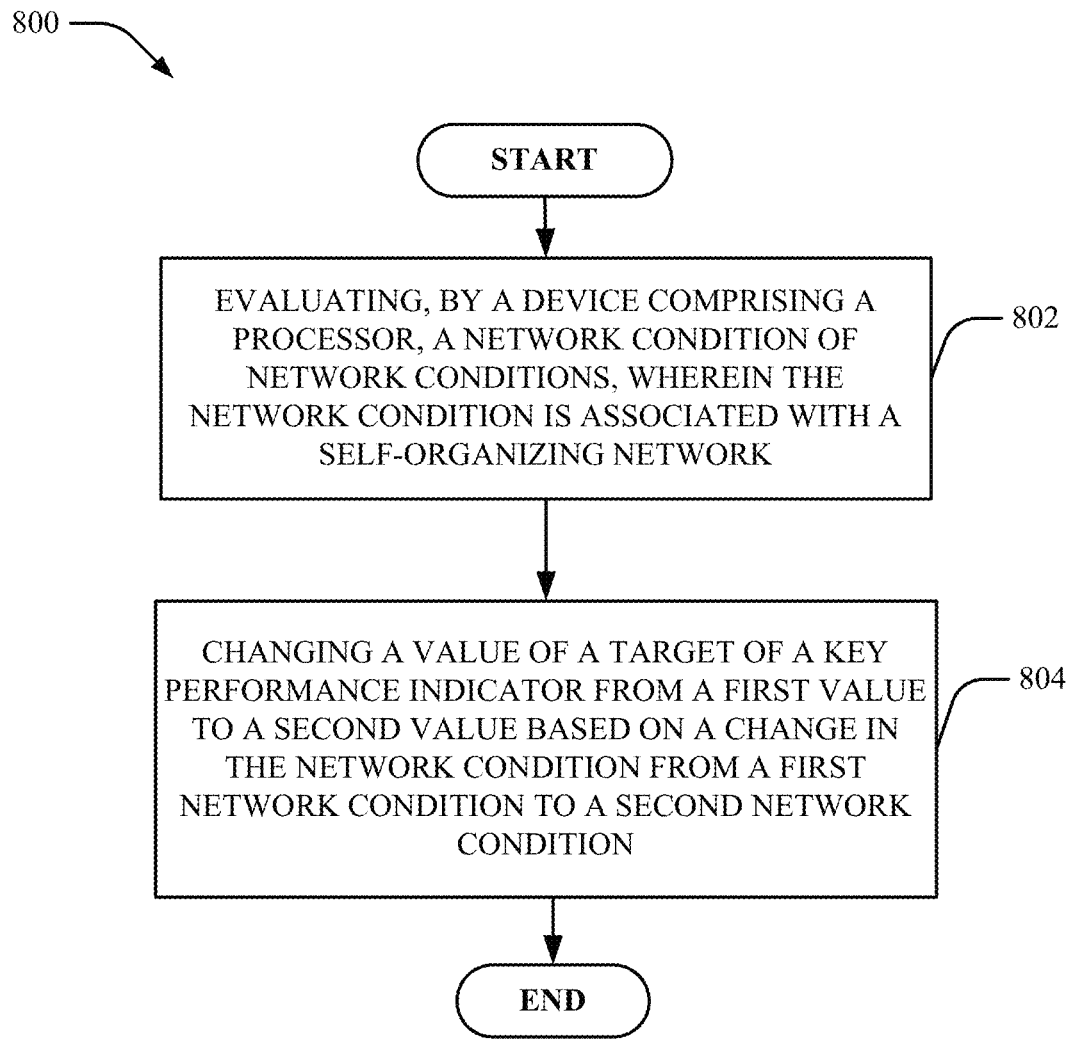
FIGS. 8-11 illustrate example flowcharts of methods that facilitate adaptive KPIs for SONs in accordance with one or more embodiments described herein.

FIGS. 8-11 illustrate example flowcharts of methods that facilitate adaptive KPIs for SONs in accordance with one or more embodiments described herein. Turning first to FIG. 8, at 802, method 800 can include evaluating a network condition, wherein the network condition is associated with a self-organizing network. The network condition can be one of a number of different possible network conditions. At 804, method 800 can include changing a value of a target of a KPI from a first value to a second value based on a change in the network condition from a first network condition to a second network condition.

Figure 9:
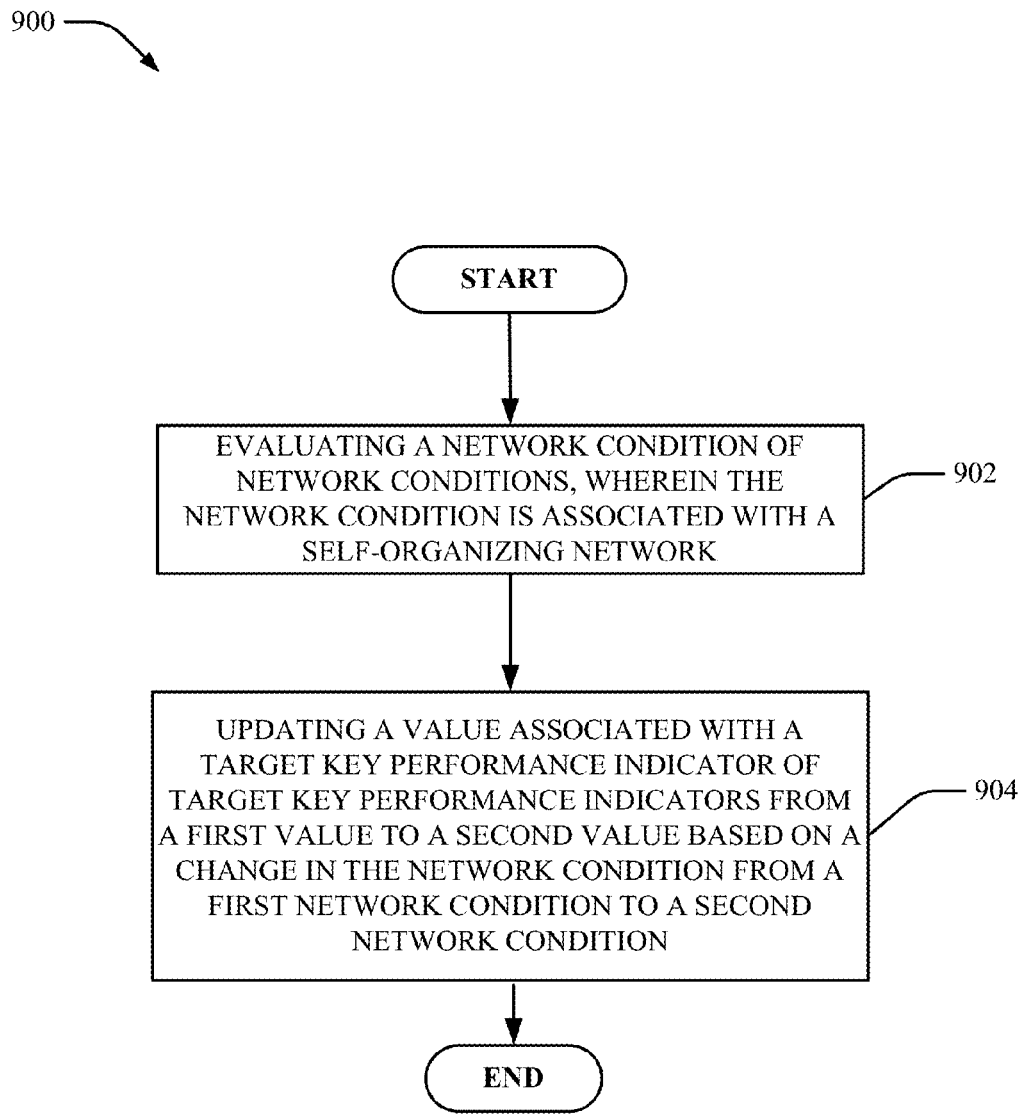

Turning now to FIG. 9, at 902, method 900 can include evaluating a network condition, wherein the network condition is associated with a self-organizing network. The network condition can be one of a number of different possible network conditions. At 904, method 900 can include updating a value associated with a target KPI of target KPIs from a first value to a second value based on a change in the network condition from a first network condition to a second network condition. In some embodiments, although not shown, the updating is further based on types of sets of instructions executing.

Figure 10:
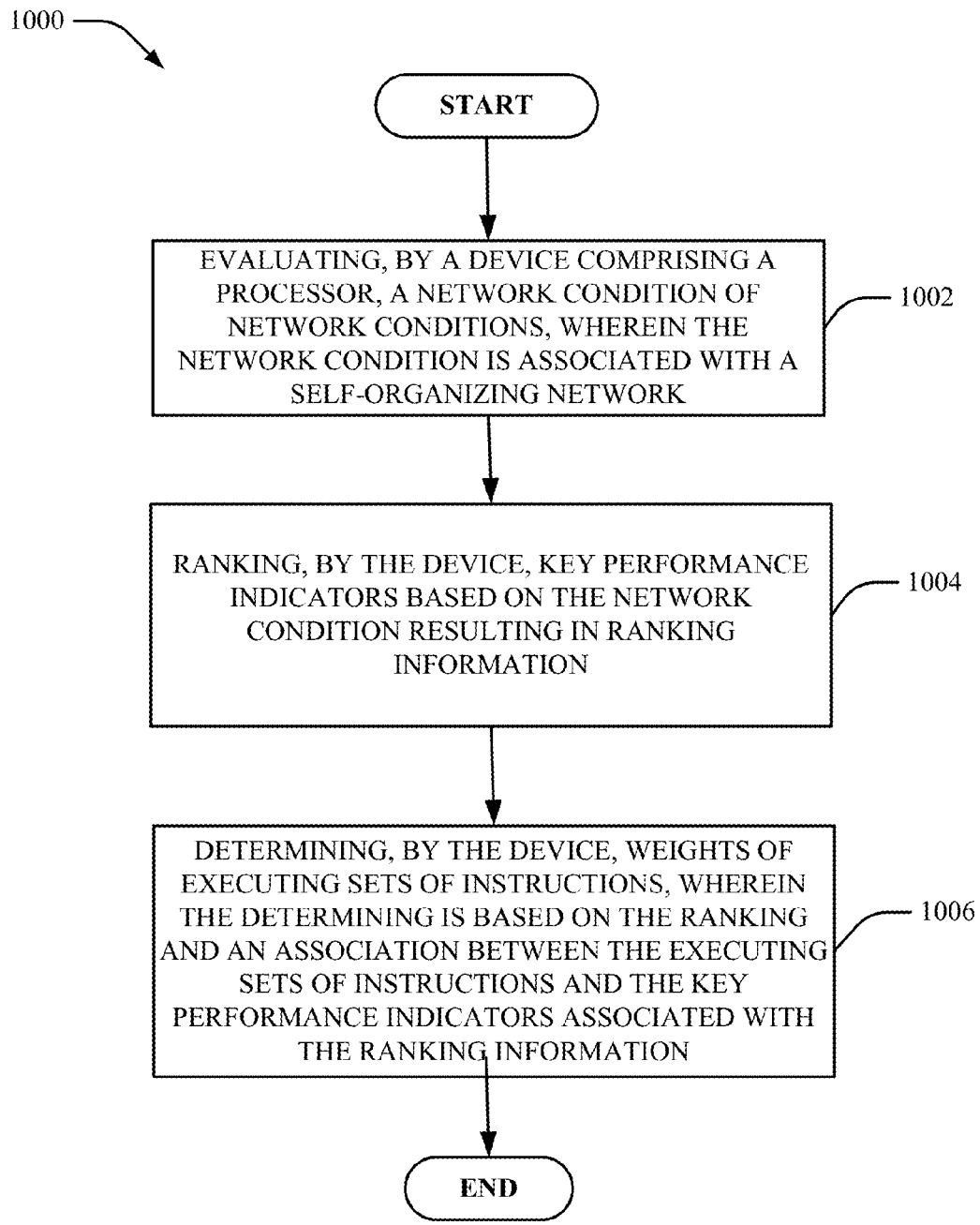

Turning now to FIG. 10, at 1002, method 1000 can include evaluating, by a device including a processor, a network condition of network conditions, wherein the network condition is associated with a self-organizing network. The network condition can be one of a number of different possible network conditions. In some embodiments, the evaluating the network condition includes evaluating a level of congestion associated with a cell device in a network experiencing the network condition. In some embodiments, the evaluating the network condition includes evaluating information indicative of dropped calls from a cell device in a network experiencing the network condition. The network condition can be a function of a traffic pattern of a network experiencing the network condition.

At 1004, method 1000 can include ranking, by the device, KPIs based on the network condition resulting in ranking information. In various embodiments, the ranking is further based on information associated with customer quality of experience.

At 1006, method 1000 can include determining, by the device, weights of executing sets of instructions, wherein the determining is based on the ranking and an association between the executing sets of instructions and the KPIs associated with the ranking information. The executing sets of instructions can be scheduled to execute serially or, in other embodiments, can be scheduled to execute concurrently.

Although not shown, the method can also include detecting a change in the network condition. In various embodiments, the evaluating, the ranking and the determining are based on the detecting the change in the network condition. Accordingly, the composite KPI target information can be updated automatically and/or dynamically based on the network condition.

Figure 11:
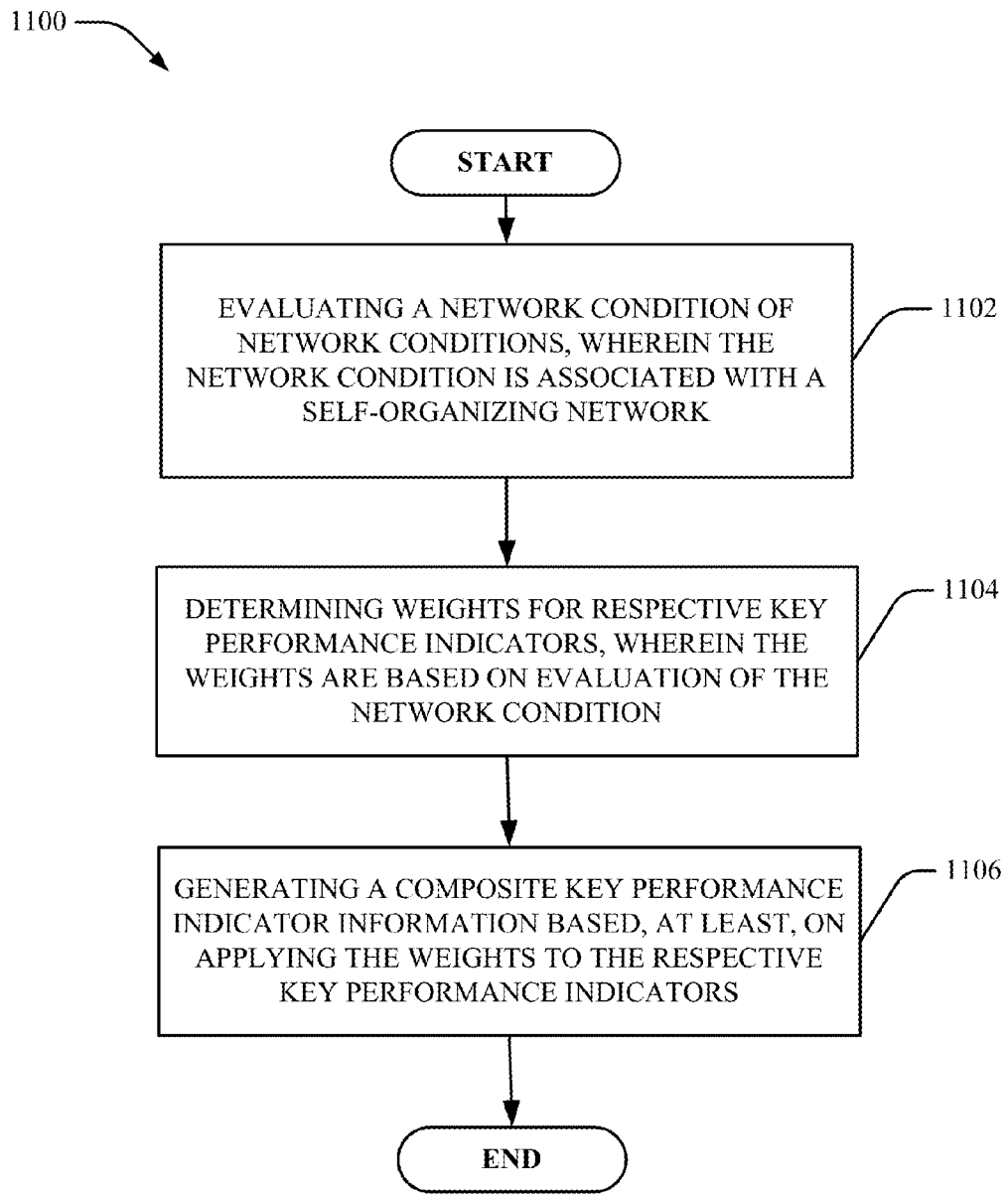

Turning now to FIG. 11, at 1102, method 1100 can include evaluating a network condition of network conditions, wherein the network condition is associated with a self-organizing network. At 1104, method 1100 can include determining weights for respective KPIs, wherein the weights are based on evaluation of the network condition. At 1106, method 1100 can include generating composite KPI information based, at least, on applying the weights to the respective KPIs. In some embodiments, although not shown, KPIs of a set of KPIs can be selected based on the network condition.

Figure 12:
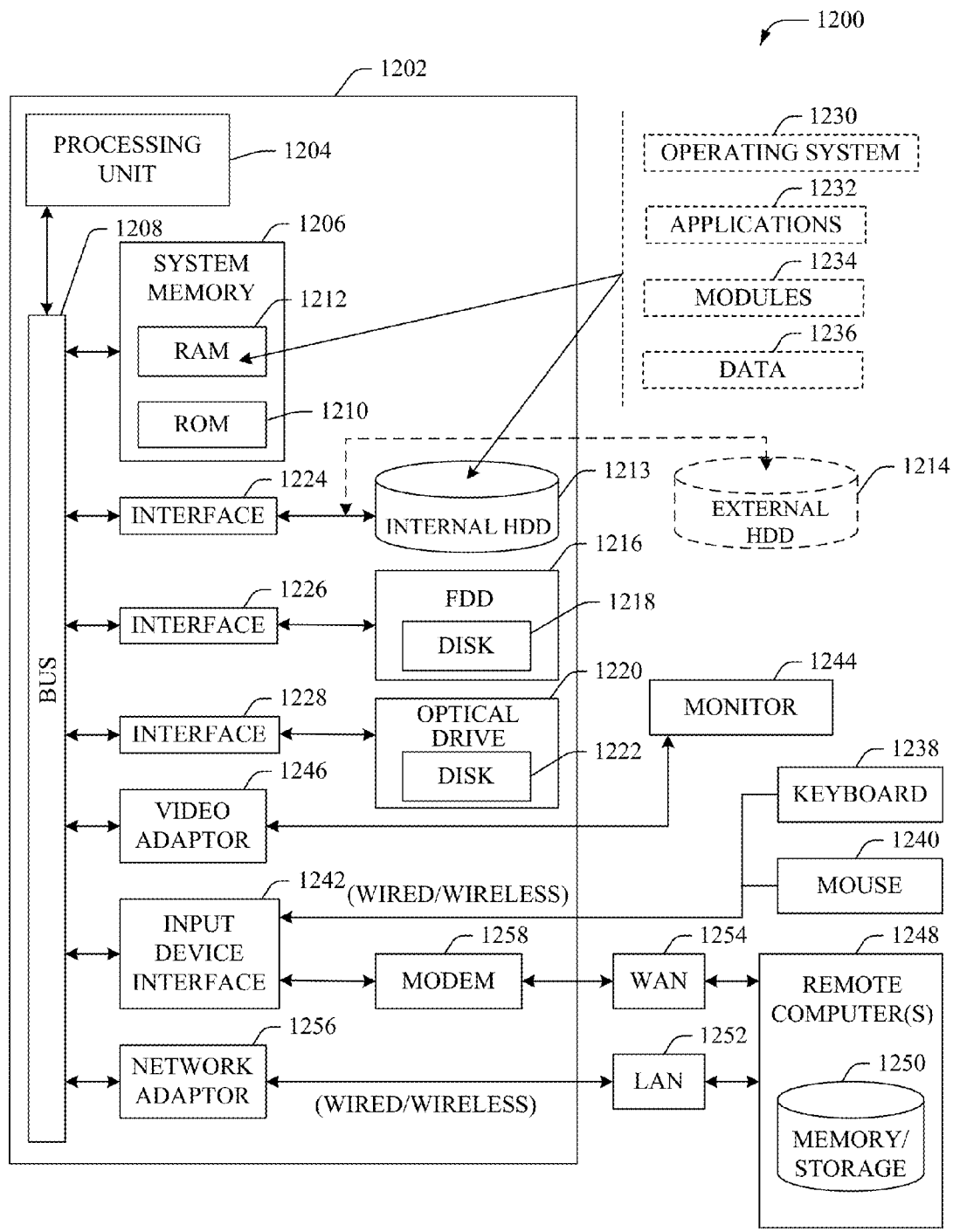
FIG. 12 illustrates a block diagram of a computer operable to facilitate adaptive KPIs for SONs in accordance with one or more embodiments described herein.

FIG. 12 illustrates a block diagram of a computer operable to facilitate content management based on profiles of members in an environment in accordance with one or more embodiments described herein. For example, in some embodiments, the computer can be or be included within any number of components described herein including, but not limited to, adaptation device 102 (or any components thereof).

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1213 (e.g., EIDE, SATA), which internal hard disk drive 1213 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface, respectively. The interface 1224 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A mobile device can enter commands and information into the computer 1202 through one or more wired/wireless input devices, e.g., a keyboard 1238 and a pointing device, such as a mouse 1240. Other input devices (not shown) can include a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a universal serial bus (USB) port, an IR interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless AP disposed thereon for communicating with the wireless adapter 1256.

When used in a WAN networking environment, the computer 1202 can include a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:
   a processor; and
   a memory that stores executable instructions that, when executed by the processor, facilitate performance of operations, comprising:
      evaluating a network condition of network conditions, wherein the network condition is associated with network devices of a self-organizing network, and wherein the evaluating comprises evaluating weather-related event traffic; and
      changing a value of a target of a key performance indicator from a first value to a second value based on a change in the network condition from a first network condition to a second network condition, wherein the changing the value of the target is further based on a third value associated with a first executing process and a fourth value associated with a second executing process and the second value is based on averaging the third value and the fourth value of the target of the key performance indicator.

2. The apparatus of claim 1, wherein the first executing process and the second executing process are associated with the key performance indicator.

3. The apparatus of claim 1, wherein the evaluating of the network condition comprises evaluating a level of congestion associated with a network device of the network devices of the self-organizing network.

4. The apparatus of claim 1, wherein the evaluating of the network condition comprises evaluating information indicative of dropped calls from a network device of the network devices of the self-organizing network.

5. The apparatus of claim 1, wherein the weather-related event traffic comprises event traffic related to a hurricane.

6. The apparatus of claim 1, wherein the evaluating of the network condition comprises evaluating a dropped call rate associated with a network device of the network devices of the self-organizing network.

7. The apparatus of claim 1, wherein the evaluating of the network condition comprises evaluating a level of coverage associated with a network device of the network devices of the self-organizing network.

8. A non-transitory machine-readable storage medium, comprising executable instructions that, when executed by a processor, facilitate performance of operations, comprising:
   evaluating a network condition of network conditions, wherein the network condition is associated with network devices of a self-organizing network, and wherein the evaluating comprises evaluating weather-related event traffic; and
   changing a value of a target of a key performance indicator from a first value to a second value based on a change in the network condition from a first network condition to a second network condition, wherein the changing the value of the target is further based on a third value associated with a first executing process and a fourth value associated with a second executing process and the second value is based on averaging the third value and the fourth value of the target of the key performance indicator.

9. The non-transitory machine-readable storage medium of claim 8, wherein the evaluating the network condition comprises evaluating a dropped call rate associated with a network device of the network devices of the self-organizing network.

10. The non-transitory machine-readable storage medium of claim 8, wherein the evaluating the network condition comprises evaluating a level of coverage associated with a network device of the network devices of the self-organizing network.

11. The non-transitory machine-readable medium of claim 8, wherein the evaluating of the network condition comprises evaluating a level of congestion associated with a network device of the network devices of the self-organizing network.

12. The non-transitory machine-readable medium of claim 8, wherein the evaluating of the network condition comprises evaluating information indicative of dropped calls from a network device of the network devices of the self-organizing network.

13. The non-transitory machine-readable medium of claim 8, wherein the evaluating of the network condition comprises evaluating information indicative of a level of coverage associated with a network device of the network devices of the self-organizing network.

14. The non-transitory machine-readable medium of claim 8, wherein the weather-related event comprises event traffic related to a storm.

15. The non-transitory machine-readable medium of claim 8, wherein the first executing process and the second executing process are associated with the key performance indicator.

16. A method, comprising:
evaluating, by a device comprising a processor, a network condition of network conditions, wherein the network condition is associated with network devices of a self-organizing network, and wherein the evaluating comprises evaluating weather-related event traffic; and
changing, by the device, a value of a target of a key performance indicator from a first value to a second value based on a change in the network condition from a first network condition to a second network condition, wherein the changing the value of the target is further based on a third value associated with a first executing process and a fourth value associated with a second executing process and the second value is based on averaging the third value and the fourth value of the target of the key performance indicator.

17. The method of claim 16, wherein the weather-related event comprises event traffic related to a storm.

18. The method of claim 16, wherein the evaluating of the network condition comprises evaluating information indicative of dropped calls from a network device of the network devices of the self-organizing network.

19. The method of claim 16, wherein the evaluating of the network condition comprises evaluating information indicative of a level of coverage associated with a network device of the network devices of the self-organizing network.

* * * * *